United States Patent [19]

Borowski

[11] Patent Number: 5,533,737
[45] Date of Patent: Jul. 9, 1996

[54] SEALS WITH PARTICLE EXCLUSION MEANS

[75] Inventor: Richard Borowski, Fairport, N.Y.

[73] Assignee: Garlock Inc., New York, N.Y.

[21] Appl. No.: 327,169

[22] Filed: Oct. 21, 1994

[51] Int. Cl.⁶ ................................. F16J 15/453
[52] U.S. Cl. ................... 277/23; 277/55; 277/56
[58] Field of Search ................. 277/14 R, 14 V, 277/25, 23, 35, 55, 56, 58, 152, 153

[56] References Cited

U.S. PATENT DOCUMENTS

| | | | |
|---|---|---|---|
| 4,277,072 | 7/1981 | Forch | 277/153 |
| 4,383,720 | 5/1983 | Ernst | 277/14 R |
| 4,426,088 | 1/1984 | Ernst | 277/14 R |
| 4,428,587 | 1/1984 | Forch | 277/153 |
| 4,436,317 | 3/1984 | Schmitt | 277/153 |
| 5,105,636 | 4/1992 | Anastase et al. | 277/58 |
| 5,110,143 | 5/1992 | Hibbetts | 277/153 |
| 5,129,744 | 7/1992 | Otto et al. | 277/152 |
| 5,480,161 | 1/1996 | Borowski | 277/23 |

FOREIGN PATENT DOCUMENTS 3902058  7/1990  Germany.

*Primary Examiner*—Scott W. Cummings
*Attorney, Agent, or Firm*—Howard S. Reiter; Richard W. Watson

[57] ABSTRACT

A particle exclusion assembly designed to operate in an inclined position and to protect an associated sealing assembly. The assembly includes radially inner and outer relatively rotatable walls and axially inner and outer baffles and a rotary, controlled porosity, open-celled element which substantially fills the cavity between the two walls and the two baffles. The open-celled element controls the rate of movement of particulate material and restricted annular opening is provided to control ingress and egress of particulate material from the open-celled element.

7 Claims, 2 Drawing Sheets

SEALS WITH PARTICLE EXCLUSION MEANS

FIELD OF THE INVENTION

The present invention relates to sealing assemblies and particle exclusion means intended to operate in an inclined position and to prevent solid particles from reaching the sealing assemblies.

BACKGROUND OF THE INVENTION

In the operation of rotary equipment operating in an inclined position and handling materials which contain or generate particles of an abrasive nature, problems have been ever present because such particles have been able to reach the sealing area and bring about excessive wear and premature seal failure. Such equipment may include pulverizers, sifters, crushers and furnaces. Previous efforts to overcome early sealing failures in such equipment have included the use of multiple seals arranged in series so that as the innermost seal fails, the next outer seal takes over the primary sealing function. Other previous designs have utilized various liquid flushing arrangements intended to carry particulate material away from the sealing area. While these prior arrangements have provided some improvement in service life, they have often occupied excessive space or been of complex and expensive design. Also, the improvements in service life have often been minimal.

SUMMARY OF THE INVENTION

Via the novel design of the present invention, many of the prior problems have been alleviated, seal life has been improved and overall cost of seal assemblies has often been reduced. The new design includes an outer baffle element, an open-celled element of controlled porosity and an inner baffle member which provides a restricted passageway into the assembly. As some particulate material enters the assembly via the restricted passageway, its further movement is restricted and directed by the outer baffle and the open-celled element in combination so that excessive particulate material is directed back into the equipment which is being sealed.

The particle exclusion assembly may be an integral part of a complete sealing assembly or it may be a separate assembly to be used in conjunction with a separate sealing assembly.

A primary object of the invention is to provide means for improving the service life of sealing assemblies operating in an inclined position and handling solid particles.

Another object of the invention is to provide such means which are adaptable to use with a wide variety of sealing assemblies.

Yet another object of the invention is to provide such means which produce lower overall costs for composite seal assemblies.

DETAILED DESCRIPTION OF THE INVENTION

Figure 1:
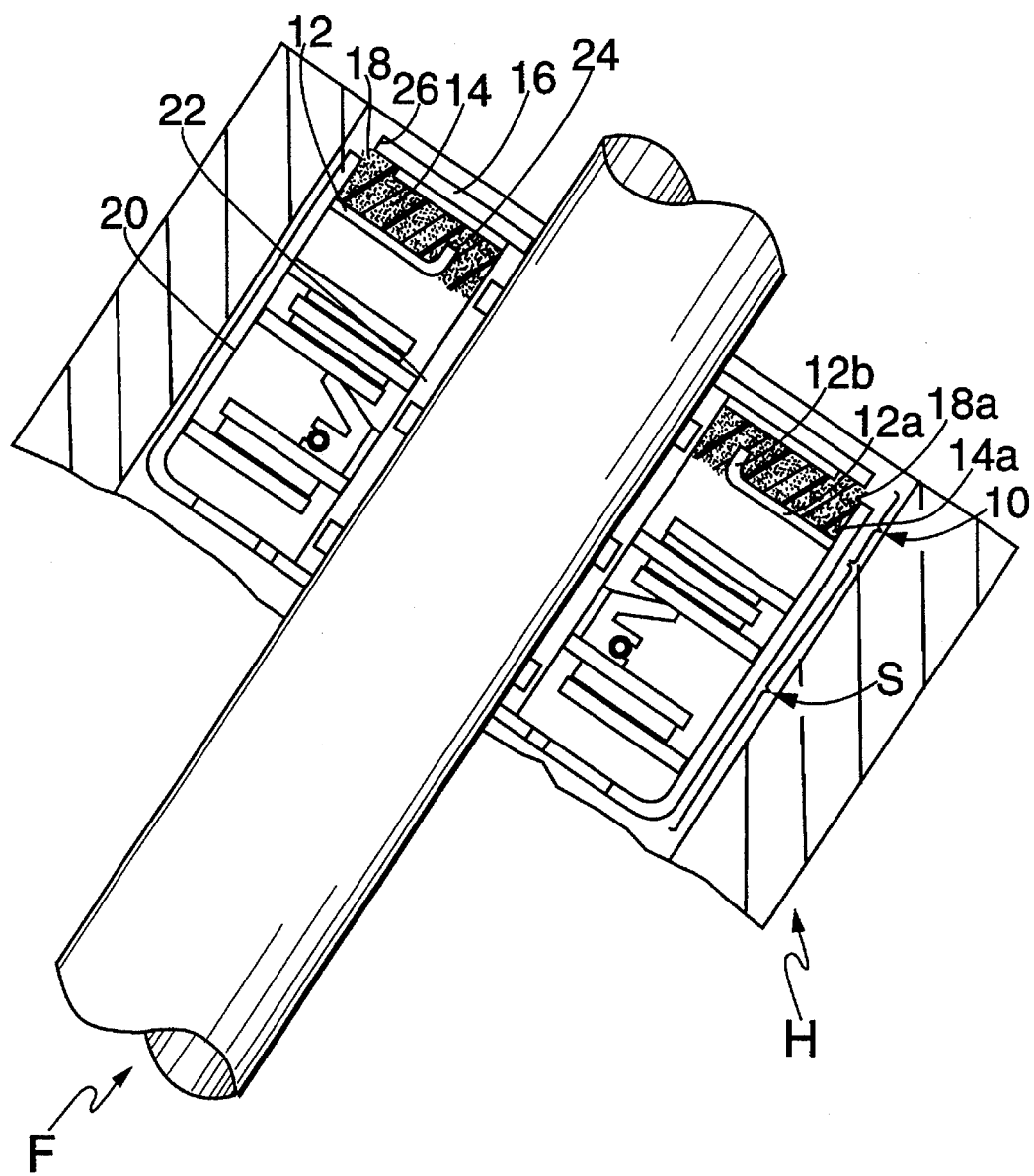
FIG. 1 is a cross-sectional view of a preferred embodiment of the invention in combination with a combination labyrinth/lip seal assembly.

FIG. 1 illustrates how particle exclusion means 10 according to a preferred embodiment of the invention may be incorporated into the structure of a standard seal S which combines labyrinth features with a lip seal. It should be noted, however, that seal S may be almost any dynamic seal or combination of such seals. In this figure, the combination structure of seal S and particle exclusion means 10 of the invention has been mounted on a shaft and is in position to be pressed into a housing. It should also be noted that the terms "axially inner" and "axially outer" as used herein refer to the relative closeness of various elements to the source of particulate materials. When seals such as seal S are used in applications where abrasive particulate material is present, the seals are subject to accelerated wear and premature failure. In order to reduce such wear and failure, a particle exclusion structure 10 has been provided which includes an axially outer baffle 12, an open-celled or foam element 14 of controlled porosity and an axially inner baffle member 16 which substantially restricts access to the interior of the overall assembly so that solid particles may enter the assembly only via restricted annular opening or passageway 18. In this embodiment seal assembly S and particle exclusion assembly 10 share a radially outer wall 20 and a radially inner wall 22. Outer baffle 12 is attached to outer wall 20 and extends radially inwardly to an inner end 24 spaced from inner wall 22. Inner baffle 16 is attached to inner wall 22 and extends radially outwardly to an outer end 26, spaced from outer wall 20 thus forming annular opening 18. In the preferred embodiment of FIG. 1, outer baffle 12 is generally L-shaped with a longer leg 12a extending radially inwardly from outer wall 20 to shorter leg 12b which extends axially inwardly to inner end 24. Open-celled element 14 is positioned between outer and inner baffles 12 and 16 and substantially fills the cavity formed by those two baffles, outer wall 20 and inner wall 22. Open-celled element 14 is affixed to or otherwise adapted to rotate with whichever of walls 20 and 22 rotates. In most applications of such equipment operating in an inclined position, it is anticipated that a housing which surrounds outer wall 20 will rotate and thus wall 20 will rotate and element 14 will rotate with that wall and any other components attached to it.

Open-celled element 14 may be any of various materials such as polyester or ceramic fiber or a variety of polyurethane foams. The primary criteria for selecting the appropriate material and porosity are the volume and the range of particle sizes being handled in the vessel being sealed. For example, in a coal pulverizer, we have found that a polyester fiber media or batt such as PE-3 or PE-5 as available from Universal Air Filter Co. of East Saint Louis, Ill., is very effective.

Particle exclusion assembly 10 has been designed specifically to function with seals S which are to operate in an inclined position, i.e. somewhere between vertical and horizontal, and most commonly between 30° and 60° from horizontal. In such applications particulate material may enter assembly 10 only through annular passageway 18. Thereafter, the particulate material will tend, due to gravity, to move toward lowest arc portion 14a of open-celled element 14. Since end 24 of baffle 12 is at all points vertically higher than the lowest arc portions 14a and 18a of element 14 and opening 18 respectively, and since baffle 12 is attached to outer wall 20, the particulate material will accumulate in area 14a until it rises to the level of lowest arc portion 18a and then overflow back into the container or housing in which it originated.

Figure 2:
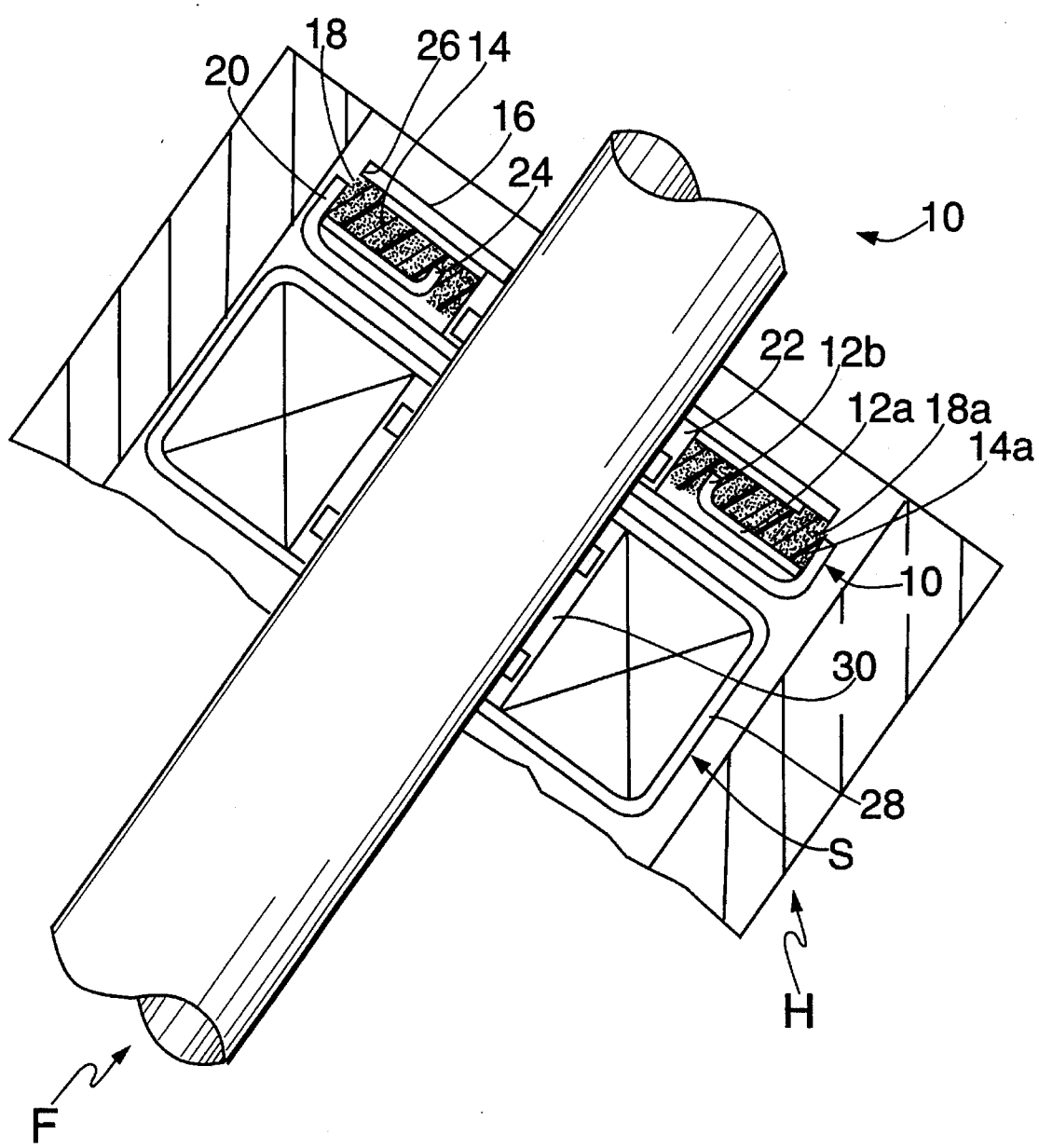
FIG. 2 is a cross-sectional view of an alternative embodiment of the invention showing particle exclusion means as a separate assembly but in association with a separate sealing assembly.

In FIG. 2 seal S and particle exclusion means 10 have been mounted on a shaft and are in position to be pressed into a housing, all in a manner similar to that of FIG. 1. In this embodiment particle exclusion means 10 is a separate assembly from seal S but the two assemblies are positioned adjacent to one another and function cooperatively. Thus, seal S has its own radially outer wall 28 and radially inner wall 30, one of which rotates relative to the other. Arrangements such as shown in this embodiment will be particularly useful in existing equipment where room is present to allow retrofitting existing sealing assemblies with particle exclusion means according to the invention.

While a preferred embodiment and some variations thereof have been shown and described in detail, other modifications will be readily apparent to those skilled in the sealing arts. For example, instead of the outer baffle being L-shaped, it could be a straight element extending radially inwardly to its inner end spaced from the inner wall. Also, in some instances, either of the baffles may be an integral portion of an associated wall rather than a separate and attached element. Thus the preceding specification should be interpreted as exemplary rather than as limiting and the scope of the invention defined by the following claims.

I claim:

1. A particle exclusion assembly intended to protect a sealing assembly and to operate in an inclined position, said particle exclusion assembly having relatively rotatable radially inner and outer walls and further including
    a. an axially outer baffle member attached to said outer wall and extending radially inwardly from said attachment to an inner end spaced from said inner wall;
    b. an axially inner baffle plate attached to an axially inner end of said inner wall, and extending radially outwardly to an outer end spaced from said outer wall to provide a narrow annular opening between said outer end and said outer wall and
    c. a rotary, controlled porosity open-celled element substantially filling a cavity formed between said inner and outer baffles and said inner and outer walls;

and characterized in that said inner end of said outer baffle member is vertically higher than the lowest arc portion of said narrow annular opening between said outer end and said outer wall when installed in said inclined position.

2. A particle exclusion assembly according to claim 1 in which said radially inner and outer walls are extended axially outwardly to form radially inner and outer walls of a seal assembly positioned between said walls and axially outwardly from said particle exclusion assembly.

3. A particle exclusion assembly according to claim 1 in which said outer baffle member is L-shaped and positioned such that the shorter leg of said L-shaped baffle extends generally axially inwardly to said inner end of said outer baffle.

4. A particle exclusion assembly according to claim 1 in which said inner wall is stationary and said outer wall rotates.

5. A composite assembly intended to operate in an inclined position and having relatively rotatable radially inner and outer walls and further including assemblies positioned between said walls, said assemblies comprising an axially outer sealing assembly having elements rotatable with said inner and outer walls and an axially inner particle exclusion assembly to protect said sealing assembly, said particle exclusion assembly including
    a. an L-shaped axially outer baffle member having a longer leg attached to said outer wall and extending radially inwardly from said attachment to a shorter leg extending generally axially inwardly from said longer leg to an inner end spaced from said inner wall;
    b. an axially inner baffle plate attached to an axially inner end of said inner wall and extending radially outwardly to an outer end spaced from said outer wall to provide a narrow annular opening between said outer end and said outer wall and
    c. a rotary, controlled porosity, open-celled element substantially filling a cavity formed between said inner and outer baffles and said inner and outer walls;

and characterized in that said inner end of said outer baffle member is vertically higher than the lowest arc portion of said narrow annular opening between said outer end and said outer wall when said assembly is installed in said inclined position.

6. A composite assembly according to claim 5 in which said sealing assembly and said particle exclusion assembly have separate inner walls and separate outer walls.

7. A composite assembly according to claim 5 in which said inner wall is stationary and said outer wall rotates.

\* \* \* \* \*